US012618732B2

(12) United States Patent
Sung et al.

(10) Patent No.: US 12,618,732 B2
(45) Date of Patent: May 5, 2026

(54) PINION SENSOR STRUCTURE OF STEERING APPARATUS AND METHOD OF ASSEMBLING PINION SENSOR STRUCTURE OF STEERING APPARATUS

(71) Applicant: HL MANDO CORPORATION, Gyeonggi-do (KR)

(72) Inventors: Taehyun Sung, Seoul (KR); Jaehoon Bae, Gyeonggi-do (KR); Dongsik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 480 days.

(21) Appl. No.: 18/126,265

(22) Filed: Mar. 24, 2023

(65) Prior Publication Data

US 2023/0304880 A1 Sep. 28, 2023

(30) Foreign Application Priority Data

Mar. 24, 2022 (KR) ........................ 10-2022-0036914

(51) Int. Cl.
G01L 5/22 (2006.01)
B62D 5/00 (2006.01)
(Continued)

(52) U.S. Cl.
CPC .............. G01L 5/221 (2013.01); B62D 5/001 (2013.01); B62D 5/0403 (2013.01);
(Continued)

(58) Field of Classification Search
CPC ..... G01L 5/221; B62D 5/0421; B62D 5/0454; B62D 15/0225; B62D 5/001;
(Continued)

(56) References Cited

U.S. PATENT DOCUMENTS 5,757,179 A * 5/1998 McCurley .............. G01D 5/145
324/207.2
6,761,244 B2 * 7/2004 Sano .................... B62D 5/0409
180/444

(Continued)

FOREIGN PATENT DOCUMENTS

JP 5638516 12/2014
KR 10-2015-0025377 3/2015

(Continued)

OTHER PUBLICATIONS

Office Action dated Nov. 11, 2025 for Korean Patent Application No. 10-2022-0036914 and its English translation provided by Applicant's foreign counsel.

*Primary Examiner* — Timothy Wilhelm
(74) *Attorney, Agent, or Firm* — WOMBLE BOND DICKINSON (US) LLP

(57) ABSTRACT

Disclosed herein is a pinion sensor structure of a steering apparatus including a housing including a first accommodating part having an open one side surface and configured to accommodate a worm wheel and a second accommodating part configured to communicate with the first accommodating part and accommodate a worm shaft engaged with the worm wheel, a sensing unit disposed to be spaced a predetermined distance from the worm wheel to face the worm wheel, and a housing cover coupled to the one side surface of the first accommodating part, wherein the sensing unit may be fixed to the housing cover.

7 Claims, 15 Drawing Sheets

(51) Int. Cl.

| | | |
|---|---|---|
| *B62D 5/04* | (2006.01) | |
| *B62D 15/02* | (2006.01) | |
| *G01B 21/22* | (2006.01) | |

(52) U.S. Cl.
CPC ......... *B62D 5/0421* (2013.01); *B62D 5/0454* (2013.01); *B62D 15/0225* (2013.01); *G01B 21/22* (2013.01); *B60Y 2410/10* (2013.01)

(58) Field of Classification Search
CPC .. B62D 5/0403; B62D 15/0235; G01B 21/22; B60Y 2410/10
See application file for complete search history.

(56) References Cited

U.S. PATENT DOCUMENTS

| | | | | |
|---|---|---|---|---|
| 6,844,541 B2* | 1/2005 | Alsobrooks | .............. | G01D 5/04 |
| | | | | 250/239 |
| 6,862,926 B2* | 3/2005 | Mukaiyama | .......... | G01D 5/165 |
| | | | | 73/114.26 |
| 7,147,496 B2* | 12/2006 | Kuerschner | .......... | B60R 16/027 |
| | | | | 439/15 |
| 7,159,688 B2* | 1/2007 | Onizuka | ................ | H02K 11/24 |
| | | | | 180/444 |
| 7,350,617 B2* | 4/2008 | Lausser | ................... | B62D 6/10 |
| | | | | 180/444 |
| 7,357,216 B2* | 4/2008 | Ishii | ....................... | B62D 3/126 |
| | | | | 74/427 |
| 7,726,208 B2* | 6/2010 | Hoeller | ................... | B62D 6/10 |
| | | | | 73/862.331 |
| 8,689,926 B2* | 4/2014 | Nagase | ............... | H02K 7/1166 |
| | | | | 180/443 |
| 8,701,503 B2* | 4/2014 | Shimizu | .................. | B62D 6/10 |
| | | | | 73/862.333 |
| 8,833,507 B2* | 9/2014 | Sekikawa | ............... | F16C 27/04 |
| | | | | 180/443 |
| 8,896,296 B2* | 11/2014 | Hamaguchi | .......... | G01D 11/245 |
| | | | | 324/207.21 |
| 8,960,364 B2* | 2/2015 | Ji | ........................... | F16H 19/04 |
| | | | | 180/443 |
| 9,168,947 B2* | 10/2015 | Shiino | .................. | B62D 5/0409 |
| 9,403,554 B2* | 8/2016 | Henning | ........... | B62D 15/0215 |
| 9,452,773 B2* | 9/2016 | Sato | ..................... | B62D 5/0421 |
| 9,469,334 B2* | 10/2016 | Ko | ............................ | F16H 1/32 |
| 9,505,431 B2* | 11/2016 | Yoshida | .................... | G01L 3/10 |
| 9,533,703 B2* | 1/2017 | Shimizu | ............... | F16D 41/064 |
| 9,540,041 B2* | 1/2017 | Murakami | ............... | B62D 6/10 |
| 9,683,873 B2* | 6/2017 | Lee | ......................... | B29C 45/00 |
| 9,707,992 B2* | 7/2017 | Kiyota | .................... | F16H 55/06 |
| 10,718,637 B2* | 7/2020 | Cai | ...................... | G01D 5/2053 |
| 10,739,215 B2* | 8/2020 | Lee | ............................ | G01L 3/02 |
| 11,273,867 B2* | 3/2022 | Sovern | .............. | B62D 15/0215 |
| 12,134,434 B2* | 11/2024 | Scheer | .................. | G01L 3/105 |
| 2013/0140105 A1* | 6/2013 | Ji | ......................... | B62D 5/0403 |
| | | | | 74/30 |
| 2016/0214648 A1* | 7/2016 | Schoepe | ................ | G01L 3/104 |
| 2019/0285140 A1* | 9/2019 | Suzuki | ................. | F16H 1/203 |
| 2022/0185364 A1* | 6/2022 | Kwon | .................. | B62D 5/0406 |
| 2023/0399047 A1* | 12/2023 | Sung | ................... | B62D 5/0454 |

FOREIGN PATENT DOCUMENTS

| | | |
|---|---|---|
| KR | 10-2016-0004694 | 1/2016 |
| KR | 10-2018-0048180 | 5/2018 |
| KR | 10-2019-0020859 | 3/2019 |
| KR | 10-2019-0044765 | 5/2019 |
| KR | 10-2002609 | 7/2019 |
| KR | 10-2008693 | 8/2019 |
| KR | 10-2020-0047036 | 5/2020 |
| KR | 10-2020-0047037 | 5/2020 |

* cited by examiner

PINION SENSOR STRUCTURE OF STEERING APPARATUS AND METHOD OF ASSEMBLING PINION SENSOR STRUCTURE OF STEERING APPARATUS

CROSS-REFERENCE TO RELATED APPLICATION

This application claims the priority benefit of Korean Patent Application No. 10-2022-0036914, filed on Mar. 24, 2022 in the Korean Intellectual Property Office, the disclosure of which is incorporated herein by reference.

BACKGROUND

1. Field

Embodiments of the present disclosure relate to a pinion sensor structure of a steering apparatus and a method of assembling the pinion sensor structure of the steering apparatus, and more specifically, to a pinion sensor structure of a steering apparatus and a method of assembling the pinion sensor structure of the steering apparatus capable of easily installing sensors.

2. Description of the Related Art

A steering apparatus is an apparatus for controlling a traveling direction of a vehicle. Such a steering apparatus includes a steering gearbox including a rack and a pinion gear, a steering shaft for transmitting rotation of a steering wheel to the pinion gear of the steering gearbox to cause a lateral operation of the rack, a tie rod for connecting knuckle parts of both wheels and both ends of the rack of the steering gearbox, respectively, and the like.

Among the steering apparatus, there are an electric power assistance steering apparatus to which a hydraulic or electric power device is added or a steer-by-wire steering apparatus to which the hydraulic or electric power device physically separated from the steering wheel to generate a steering force according to the steering of the steering wheel is added. Such a steering apparatus is a type of assisting steering by rotating the steering shaft or laterally moving the rack with a motor.

Among the steering apparatuses, the electric steering apparatus may be provided with a worm wheel and a worm shaft in order to transmit power to the rack through the pinion gear. The worm shaft is provided to be engaged with the worm wheel to transmit power generated from the motor to the worm wheel, and an output shaft provided with the pinion gear is coupled to the worm wheel to rotate together with the rotation of the worm wheel. Accordingly, the rack engaged with the pinion gear laterally moves and assists steering. The worm wheel and the worm shaft are accommodated inside a housing, and the housing has an open one side surface to accommodate the worm wheel, and a housing cover shields the one side surface of the housing and is coupled to the housing.

In addition, the electric steering apparatus may be controlled through an electronic control unit (ECU). For example, a handle operation force of a driver is detected by a torque sensor, an angle sensor, or the like and transmitted to the ECU, and the motor is driven according to signals detected by the ECU. Accordingly, there is provided a sensor for detecting a rotating angle or a rotating torque of the worm wheel operated according to the driving of the motor.

In this case, as the sensor, the torque angle sensor capable of detecting a torque and a rotating angle by one sensor may be used.

Such a sensor is disposed to face the worm wheel and is installed on the output shaft, and the sensor needs to be fixed not to be rotated to detect the rotation of the worm wheel and the pinion.

SUMMARY

Therefore, it is an aspect of the present disclosure to provide a pinion sensor structure of a steering apparatus and a method of assembling the pinion sensor structure of the steering apparatus capable of easily installing a sensor.

Additional aspects of the disclosure will be set forth in part in the description which follows and, in part, will be obvious from the description, or may be learned by practice of the disclosure.

In accordance with one aspect of the present disclosure, a pinion sensor structure of a steering apparatus includes a housing including a first accommodating part having an open one side surface and configured to accommodate a worm wheel and a second accommodating part configured to communicate with the first accommodating part and accommodate a worm shaft engaged with the worm wheel, a sensing unit disposed to be spaced a predetermined distance from the worm wheel to face the worm wheel, and a housing cover coupled to the one side surface of the first accommodating part, wherein the sensing unit may be fixed to the housing cover.

The sensing unit may include a coupling part formed to protrude from a frame forming an exterior of the sensing unit, and the housing cover may include a fixing slot formed on an inner surface of the housing cover so that the coupling part is inserted and coupled thereto.

The first accommodating part may be formed with a first boss part with which one side surface of the coupling part may be in contact, and the fixing slot may be formed with a second boss part with which the other side surface of the coupling part may be in contact.

The fixing slot may have a first slot surface formed at one side thereof and extending in a slot direction to form the second boss part, and a second slot surface formed at the other side thereof and extending shorter than the first slot surface in the slot direction.

When the housing cover is coupled to the housing, the coupling part may be in contact with the second boss part, coupled to the fixing slot, and spaced apart from the first boss part.

In accordance with another aspect of the present disclosure, a steering apparatus includes a housing including a first accommodating part having an open one side surface and configured to accommodate a worm wheel coupled to an output shaft and a second accommodating part configured to communicate with the first accommodating part and accommodate a worm shaft engaged with the worm wheel, a motor coupled to the worm shaft to provide a rotating force to the worm wheel through the worm shaft, a sensing unit disposed to be spaced a predetermined distance from the worm wheel to face the worm wheel, and a housing cover coupled to the one side surface of the first accommodating part, wherein the sensing unit may be fixed to the housing cover.

The sensing unit may include a coupling part formed to protrude from a frame forming an exterior of the sensing unit, and the housing cover may include a fixing slot formed on an inner surface of the housing cover so that the coupling part is inserted and coupled thereto.

The first accommodating part may be formed with a first boss part with which one side surface of the coupling part may be in contact, and the fixing slot may be formed with a second boss part with which the other side surface of the coupling part may be in contact.

The fixing slot may have a first slot surface formed at one side thereof and extending in a slot direction to form the second boss part, and a second slot surface formed at the other side thereof and extending shorter than the first slot surface in the slot direction.

When the housing cover is coupled to the housing, the coupling part may be in contact with the second boss part, coupled to the fixing slot, and spaced apart from the first boss part.

In accordance with still another aspect of the present disclosure, a method of assembling a pinion sensor structure of a steering apparatus includes arranging a sensing unit to be spaced a predetermined distance from a worm wheel to face the worm wheel, accommodating the worm wheel and the sensing unit in a first accommodating part having an open one side surface and provided in a housing, arranging one side surface of a coupling part formed to protrude from the sensing unit to be in contact with a first boss part formed in the first accommodating part, arranging a housing cover so that a second boss part formed on a fixing slot of the housing cover is in contact with the other side surface of the coupling part, assembling the housing cover to be in contact with one side surface of the first accommodating part in a state in which the coupling part and the second boss part are in contact with each other and coupling the coupling part and the fixing slot, aligning the housing cover and the housing and separating the coupling part from the first boss part, and coupling the housing cover and the housing.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a view showing a state in which the sensing unit is accommodated in the housing according to the method of

Figure 10:
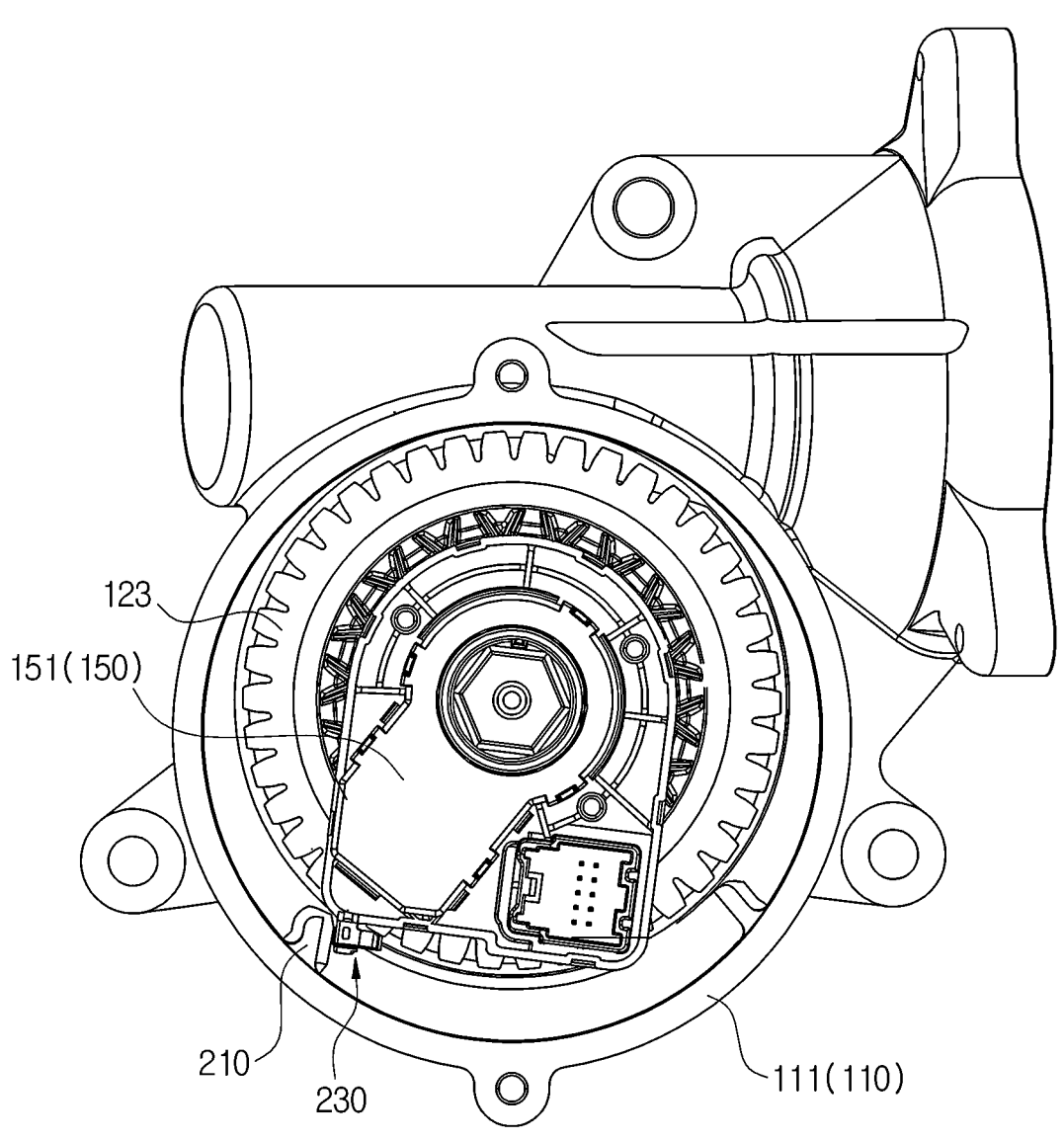
Figure 11:
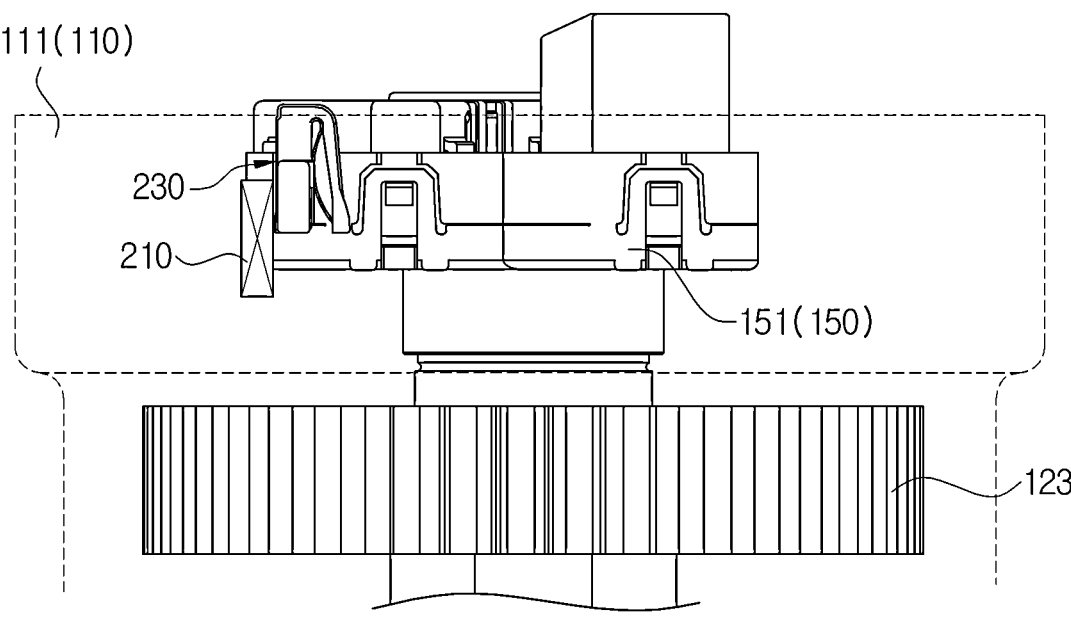
Figure 12:
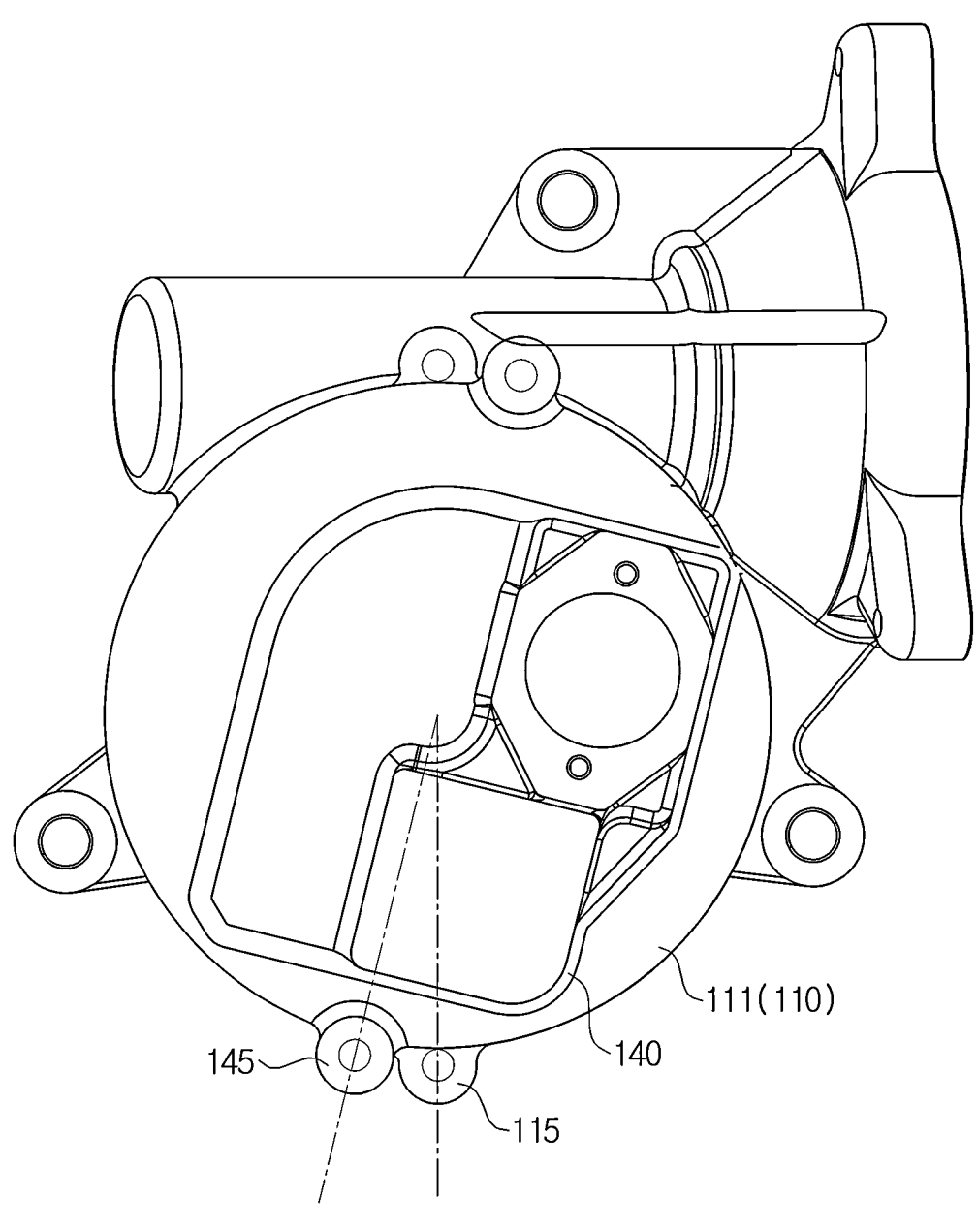
Figure 13:
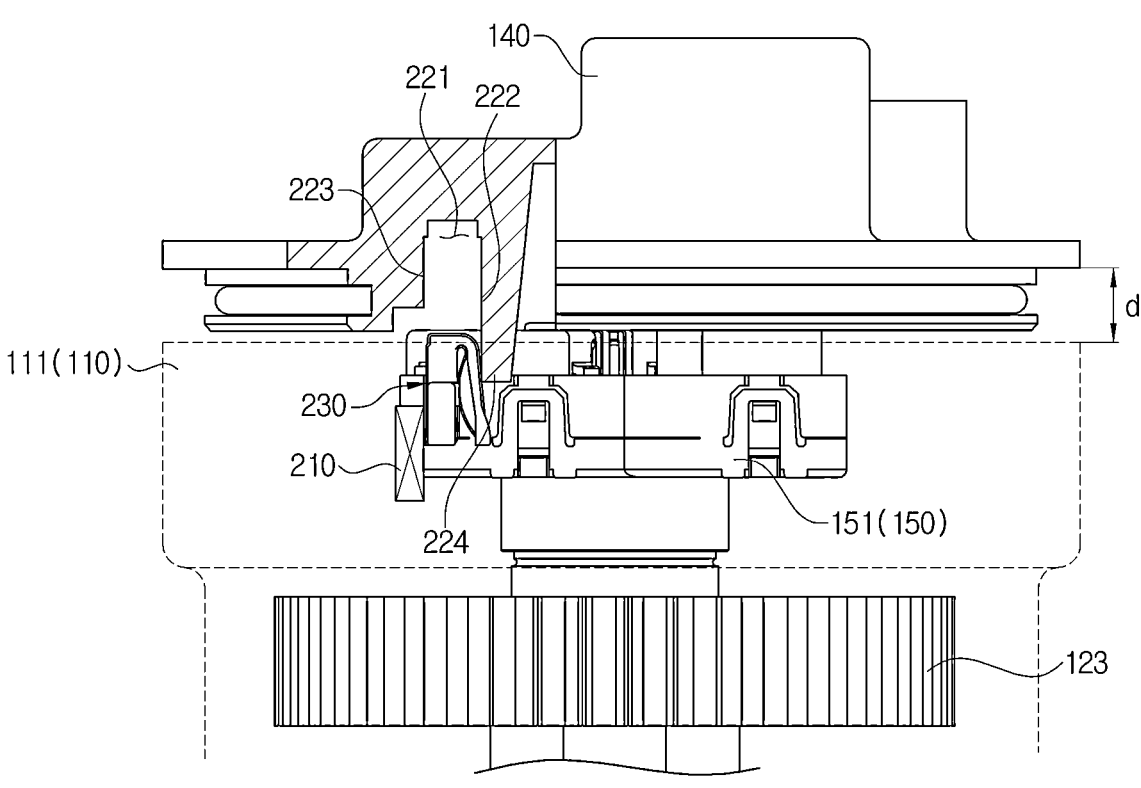
Figure 14:
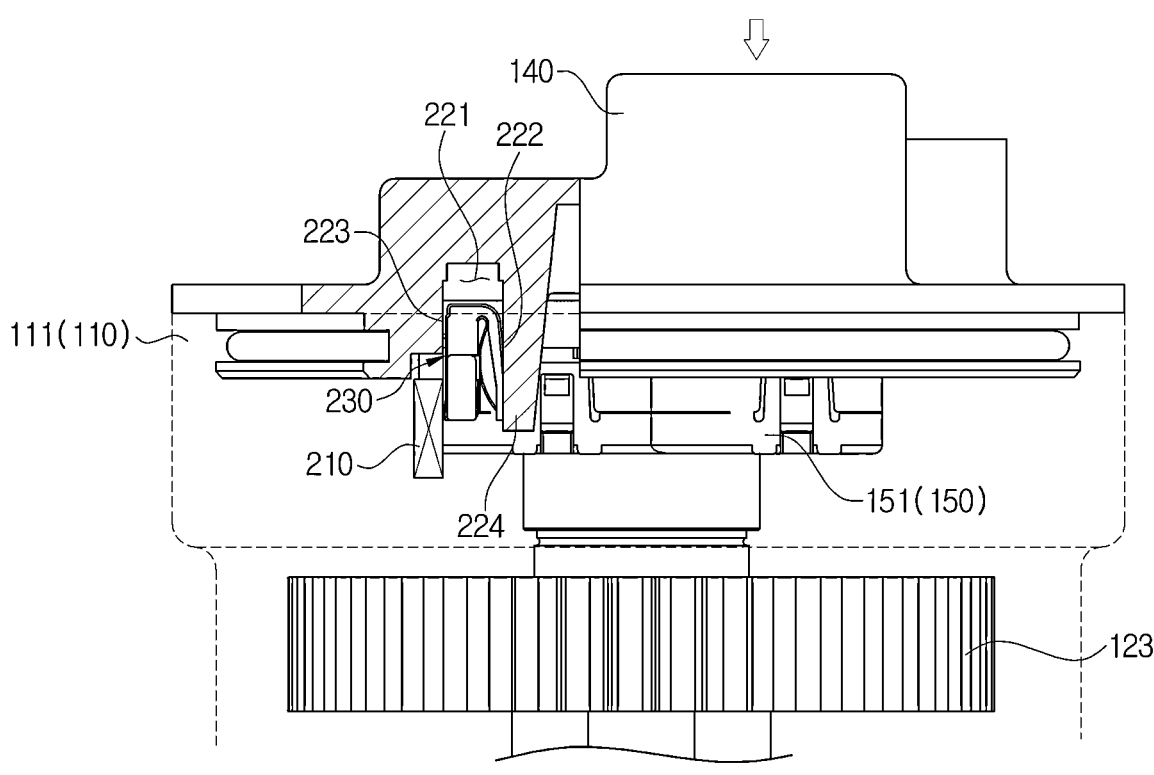
Figure 15:
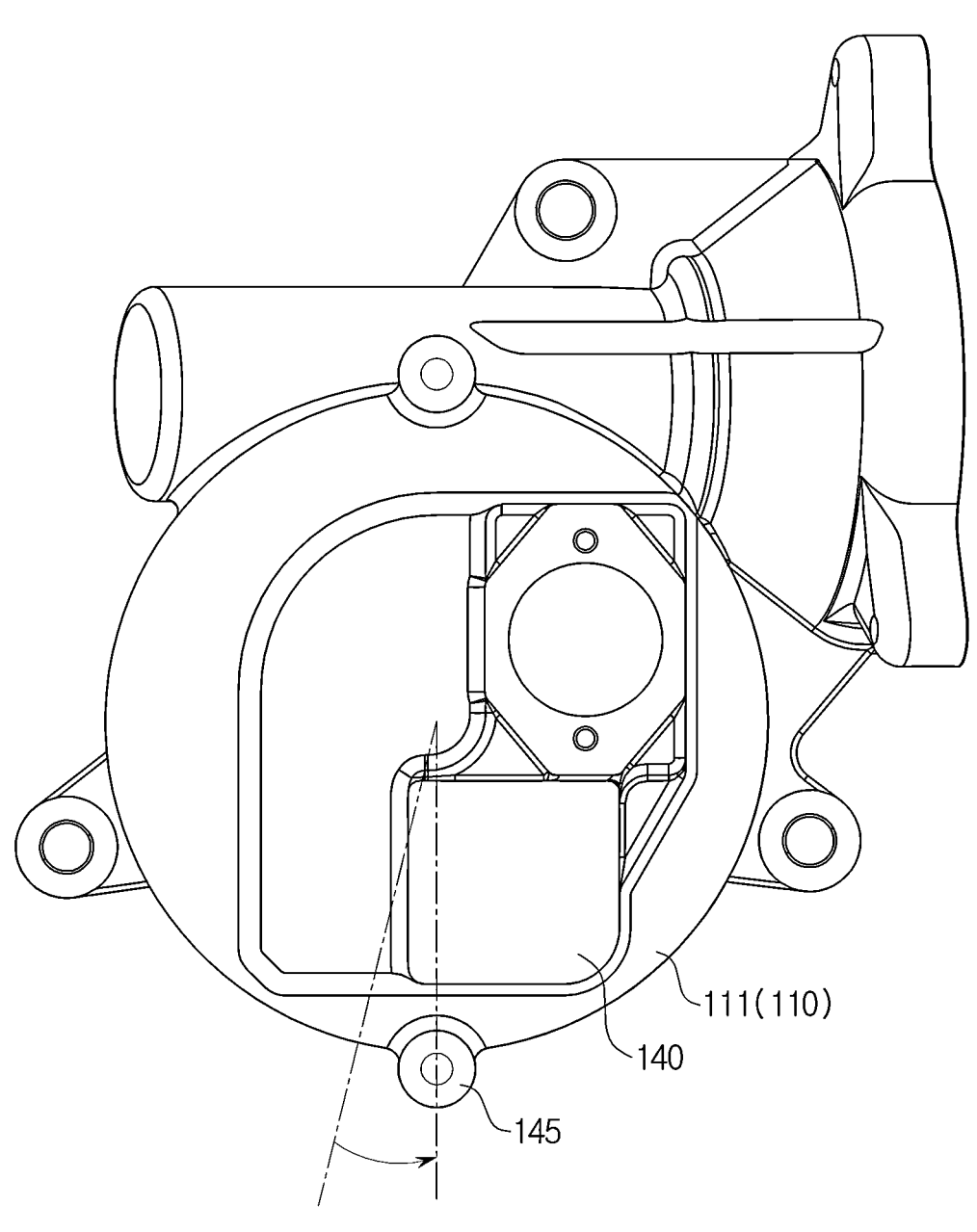
Figure 16:
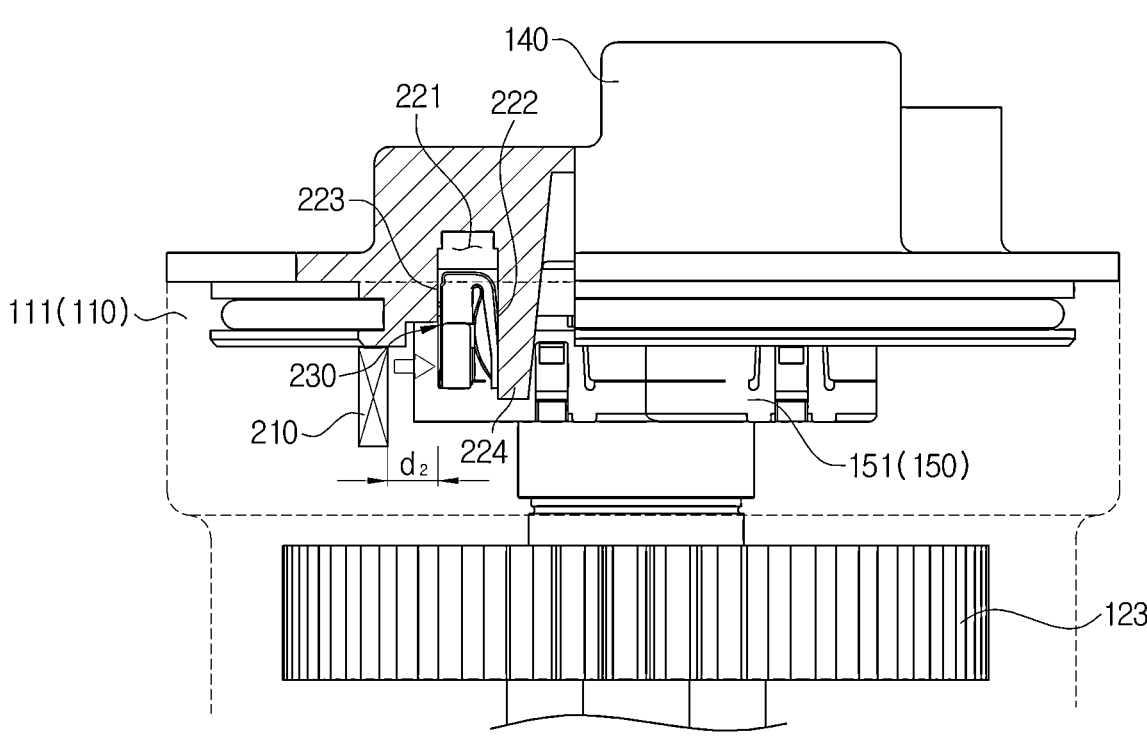

4 assembling the pinion sensor structure according to one embodiment of the present disclosure;

FIGS. 10 and 11 are views showing a state in which one side surface of the coupling part is disposed to be in contact with the first boss part according to the method of assembling the pinion sensor structure according to one embodiment of the present disclosure;

FIGS. 12 and 13 are views showing a state in which the housing cover is disposed according to the method of assembling the pinion sensor structure according to one embodiment of the present disclosure;

FIG. 14 is a view showing a state in which the coupling part and the fixing slot are coupled according to the method of assembling the pinion sensor structure according to one embodiment of the present disclosure; and FIGS. 15 and 16 are views showing a state in which the coupling part and the first boss part are separated according to the method of assembling the pinion sensor structure according to one embodiment of the present disclosure.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, each of a plurality of "units, modules, members, and blocks" may be implemented as one component or one "unit, module, member, and block" may also include a plurality of components.

Throughout the specification, when a certain portion is described as being "connected" to another, this includes not only a case of being directly connected thereto but also a case of being indirectly connected thereto, and the indirect connection includes connection through a wireless communication network.

In addition, when a certain portion is described as "including," a certain component, this means further including other components rather than precluding other components unless especially stated otherwise.

Throughout the specification, when a certain member is described as being positioned "on" another, this includes not only a case where the certain member is in contact with another but also a case where other members are present between the two members.

Terms such as first and second are used to distinguish one component from another, and the components are not limited by the above-described terms. A singular expression includes plural expressions unless the context clearly dictates otherwise.

Figure 1:
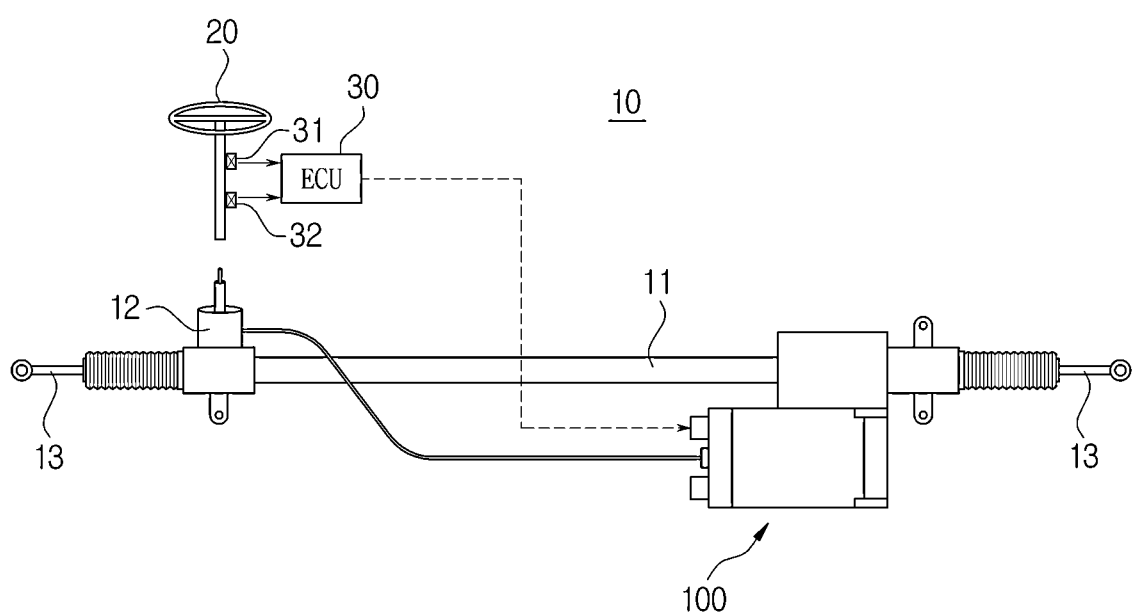
FIG. 1 is a view showing an electric steering apparatus according to one embodiment of the present disclosure.

FIG. 1 is a view showing an electric steering apparatus according to one embodiment of the present disclosure.

Referring to FIG. 1, a steering apparatus 10 may include a steering gearbox 11 in which a rack and a pinion gear 126 (see FIG. 3) are embedded, a steering shaft connector 12 to which a steering shaft (not shown) is connected, tie rods 13 for connecting both ends of the rack of the steering gearbox 11, respectively, and an electric steering apparatus 100 installed on the steering gearbox 11 and generating a steering force by operating the rack according to steering.

Referring to FIG. 1, the steering apparatus 10 may include a torque sensor 31 for detecting a torque applied by a driver to a steering wheel 20 and outputting the torque as an electrical signal, an angle sensor 32 for detecting a rotating angle of the steering wheel 20 and outputting the rotating angle as an electrical signal, and an ECU for generating a control signal based on the electrical signals output from the torque sensor 31 and the angle sensor 32. In this case, the ECU 30 compares signal values input from the torque sensor 31 and the angle sensor 32 with preset data to control a motor 130 (see FIG. 3). That is, the electric steering apparatus 100 may be controlled to generate power based on output signals of the ECU 30.

Figure 2:
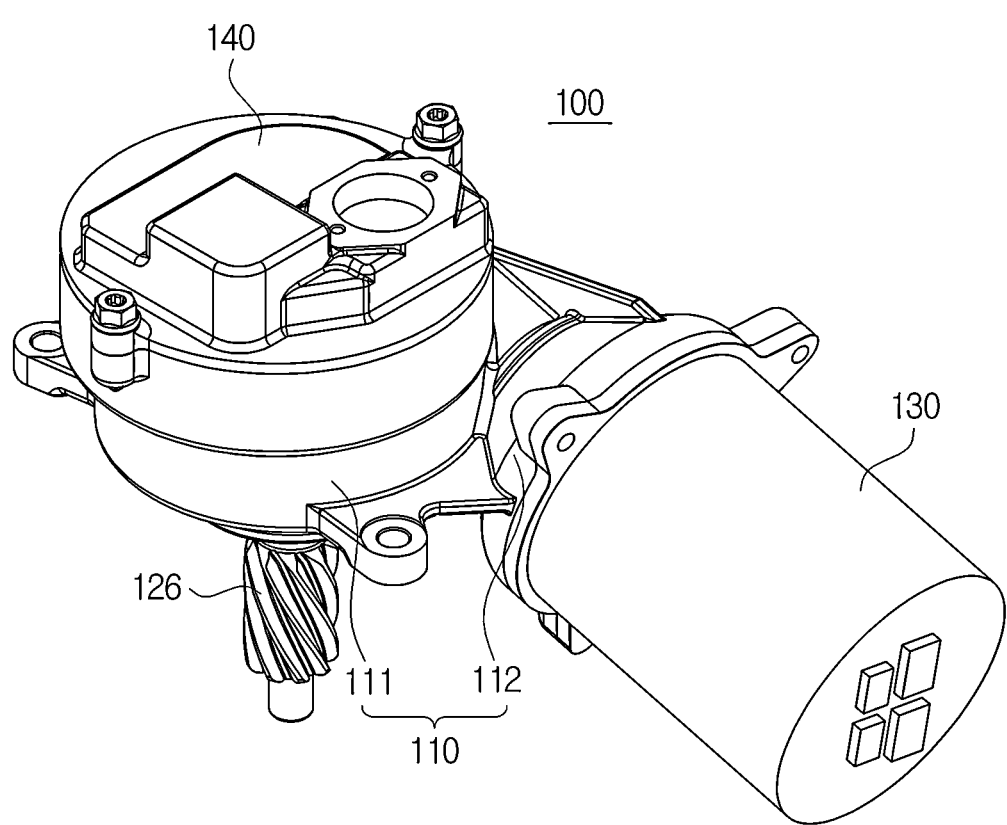
FIG. 2 is a perspective view showing a steering apparatus to which a pinion sensor structure according to one embodiment of the present disclosure is applied.
Figure 3:
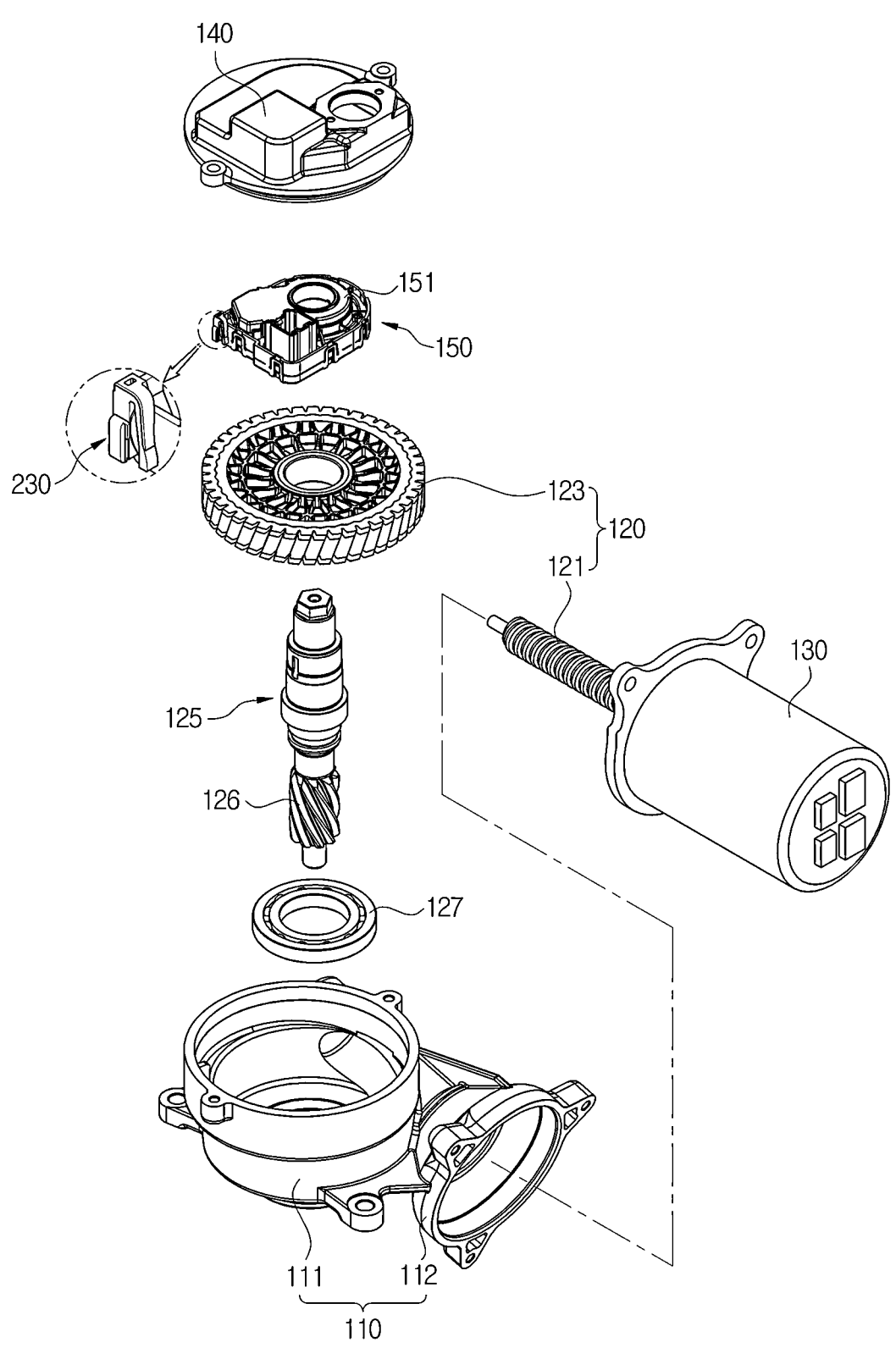
FIG. 3 is an exploded perspective view of the steering apparatus in FIG. 1.
Figure 4:
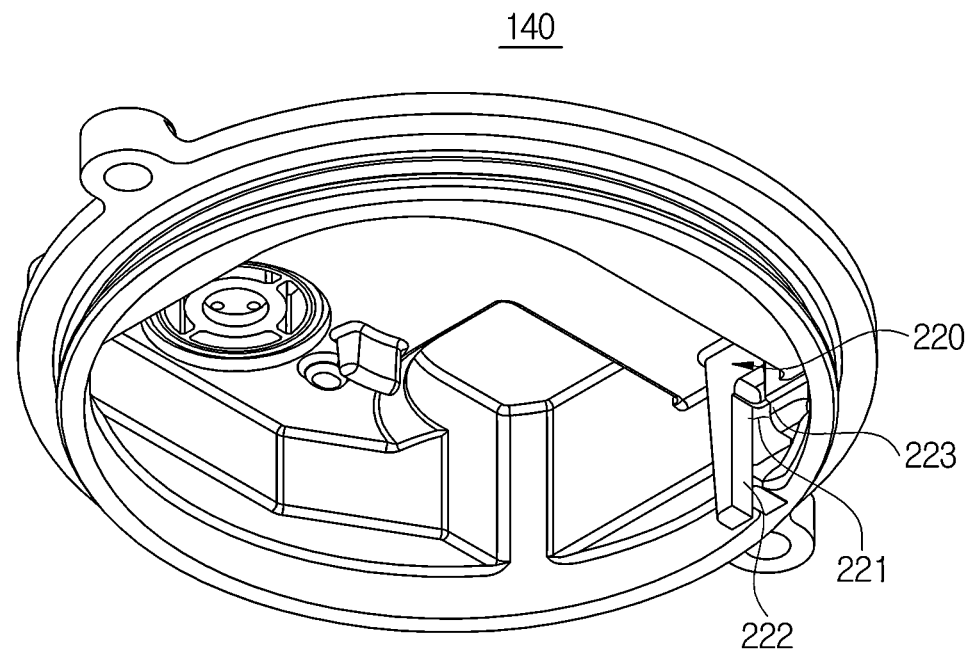
FIG. 4 is a perspective view showing a state of a fixing slot provided on a housing cover of the pinion sensor structure according to one embodiment of the present disclosure.
Figure 6:
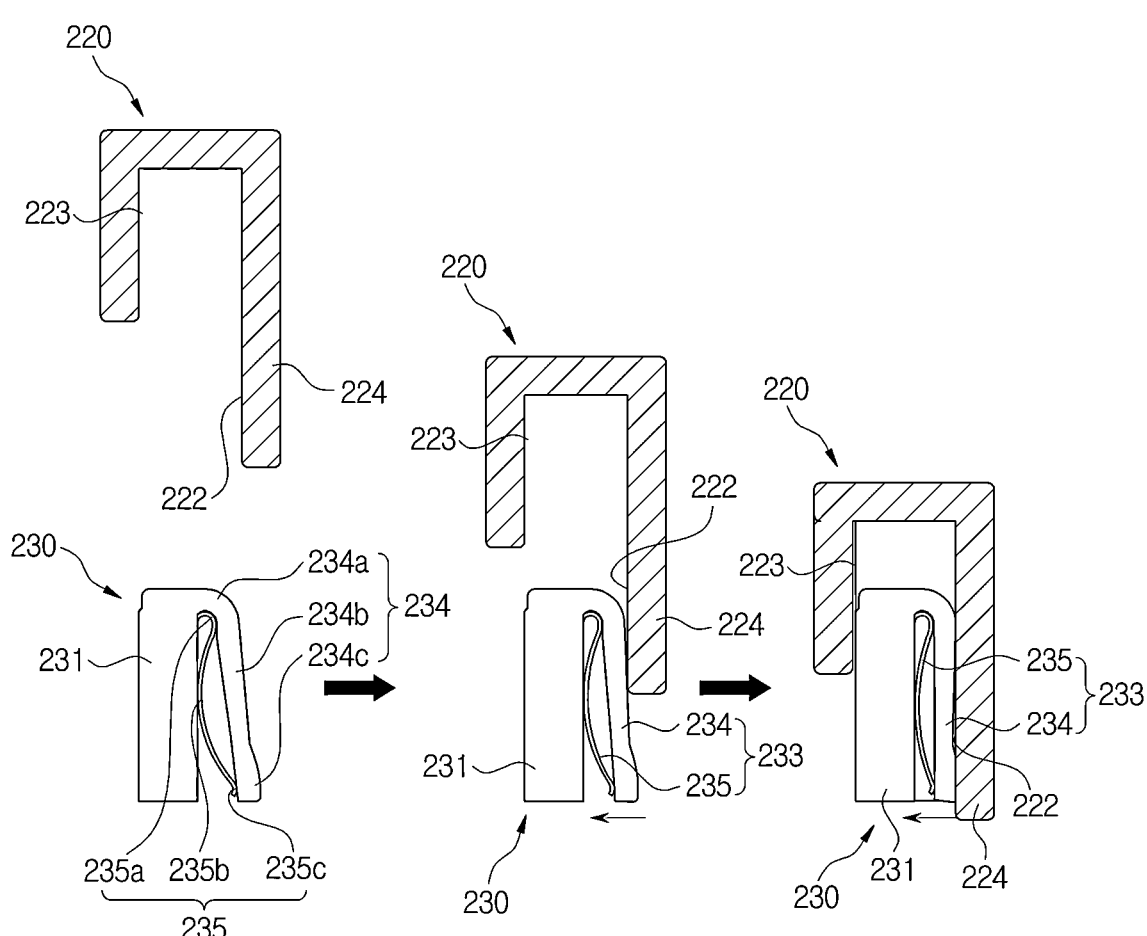
FIG. 6 is a view showing a state in which the fixing slot and a coupling part according to one embodiment of the present disclosure are coupled.
Figure 7:
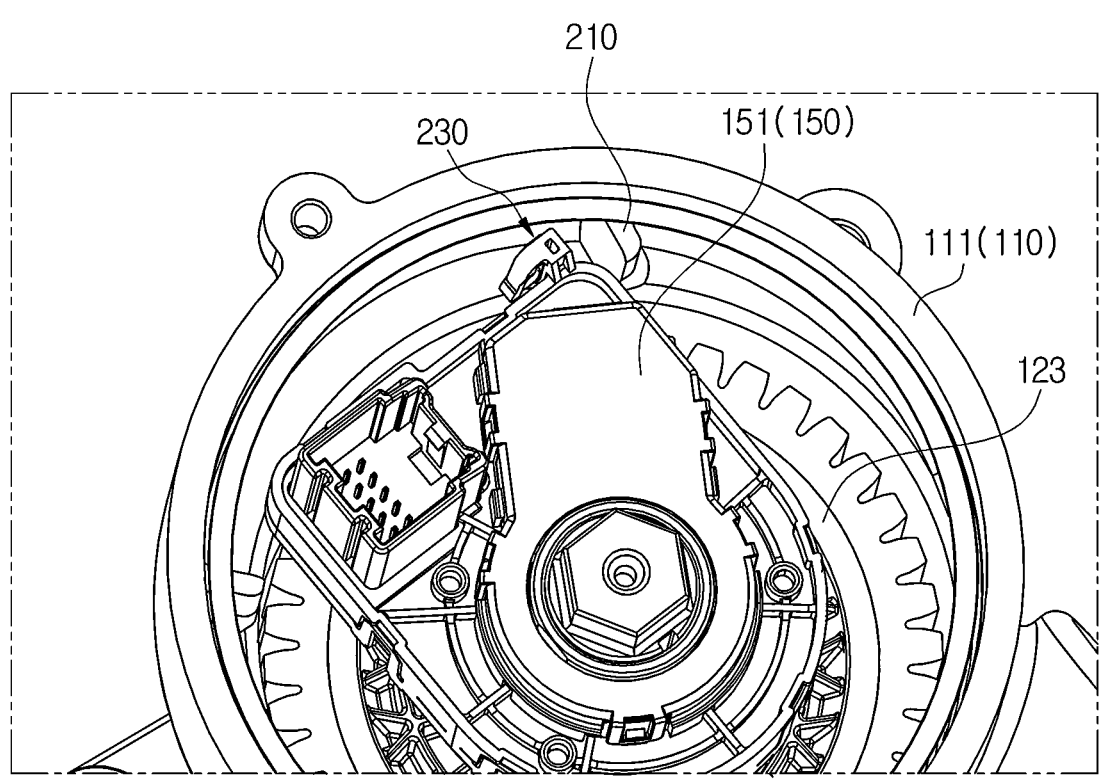
FIG. 7 is a partially enlarged view showing a state of a first boss part provided in a housing according to one embodiment of the present disclosure.

FIG. 2 is a perspective view showing a steering apparatus to which a pinion sensor structure according to one embodiment of the present disclosure is applied, FIG. 3 is an exploded perspective view of the steering apparatus in FIG. 1, FIG. 4 is a perspective view showing a state of a fixing slot provided on a housing cover of the pinion sensor structure according to one embodiment of the present disclosure, FIG. is a cross-sectional view showing a coupling state of a fastening device according to one embodiment of the present disclosure, FIG. 6 is a view showing a state in which the fixing slot and a coupling part according to one embodiment of the present disclosure are coupled, and FIG. 7 is a partially enlarged view showing a state of a first boss part provided in a housing according to one embodiment of the present disclosure.

Referring to FIGS. 2 to 7, the steering apparatus 10 according to one aspect of the present disclosure may include a housing 110 in which a reducer 120 is accommodated, a housing cover 140 coupled to the housing 110, a motor 130 for providing a rotating force to the reducer 120, a sensing unit 150 disposed in the housing 110, and a fastening device 200 for fixing the sensing unit 150 to the housing 110.

The reducer 120 amplifies the power generated from the motor 130 and transmits the power to a rack (not shown) and may be composed of a worm shaft 121 and a worm wheel 123.

The worm shaft 121 is connected to a motor shaft to be rotated by the driving of the motor 130. A worm gear is formed on an outer circumferential surface of the worm shaft 121.

An outer circumferential surface of the worm wheel 123 is formed with gear teeth engaged with the worm gear. An output shaft 125 on which the pinion gear 126 is formed is coupled to the center of the worm wheel 123. That is, the worm wheel 123 rotates together with the output shaft 125 by the rotating force received from the worm shaft 121, and the rack engaged with the pinion gear 126 laterally moves to assist an operation of a steering wheel 20 (see FIG. 1) of a driver or drives the steering apparatus according to the operation of the steering wheel of the driver.

The worm wheel 123 and the worm shaft 121 are respectively accommodated in a first accommodating part 111 and a second accommodating part 112 of the housing 110. That is, the first accommodating part 111 and the second accommodating part 112 are provided to partially communicate with each other, and the worm wheel 123 and the worm shaft 121 are engaged at a portion in which the first accommodating part 111 and the second accommodating part 112 communicate with each other.

The first accommodating part 111 has an open one side surface to accommodate the worm wheel 123, and as shown, is open in an axial direction of the worm wheel 123, and the housing cover 140 is coupled to the open one side surface of the first accommodating part 111. The open one side surface of the first accommodating part 111 is shield by the coupling of the housing cover 140, and the sensing unit 150 is provided between the housing cover 140 and the first accommodating part 111. The output shaft 125 coupled to the center of the worm wheel 123 passes through the other side surface of the first accommodating part 111 of the housing 110 and is connected to the rack and rotatably supported by a bearing 127 in the first accommodating part 111.

Meanwhile, a first boss part 210 is formed on an inner surface of the first accommodating part 111. The first boss part 210 will be described again below as one of the fastening device 200 for fixing the sensing unit 150 to the housing 110.

The motor 130 is coupled by inserting the worm shaft 121 coupled to the motor shaft into the second accommodating part 112. Accordingly, the one open side surface of the second accommodating part 112 is shielded by the motor 130.

The sensing unit 150 is connected to the output shaft 125 to be spaced a predetermined distance from the worm wheel 123 and face the worm wheel 123. The sensing unit 150 is provided as an angle sensor for measuring a rotating angle of the worm wheel 123 rotated by the driving of the motor 130 or provided as a torque angle sensor capable of detecting a torque and a rotating angle from one sensor. The sensing unit 150 may be provided to detect the rotating angle of the worm wheel 123 and transmit the detected measured value to the ECU 30 (see FIG. 1). Since the sensing unit 150 is a well-known technology, a detailed description thereof will be omitted.

Meanwhile, a coupling part 230 may be formed to protrude from a frame 151 forming an exterior of the sensing unit 150. The coupling part 230 will be described again below as one of the fastening device 200 for fixing the sensing unit 150 to the housing 110.

The fastening device 200 fixes the sensing unit 150 to the housing 110 and may include the first boss part 210 formed on an inner surface of the housing 110, the coupling part 230 provided on the sensing unit 150, and the fixing slot 220 formed on an inner surface of the housing cover 140 so that the coupling part 230 is inserted and coupled thereto.

The first boss part 210 with which one side surface of the coupling part 230 may be in contact may be formed in the first accommodating part 111. As shown in FIG. 7, the first boss part 210 may be formed to protrude from an inner circumferential surface of the first accommodating part 111 so that the sensing unit 150 may be in contact with one side surface of the protruded coupling part 230 when rotated about the output shaft 125.

The first boss part 210 may serve as a guide for temporarily fixing the coupling part 230 in order to insert the coupling part 230 into the fixing slot 220 to be described below.

The fixing slot 220 is formed on the inner surface of the housing cover 140 so that the coupling part 230 may be inserted and coupled thereto.

Figure 5:
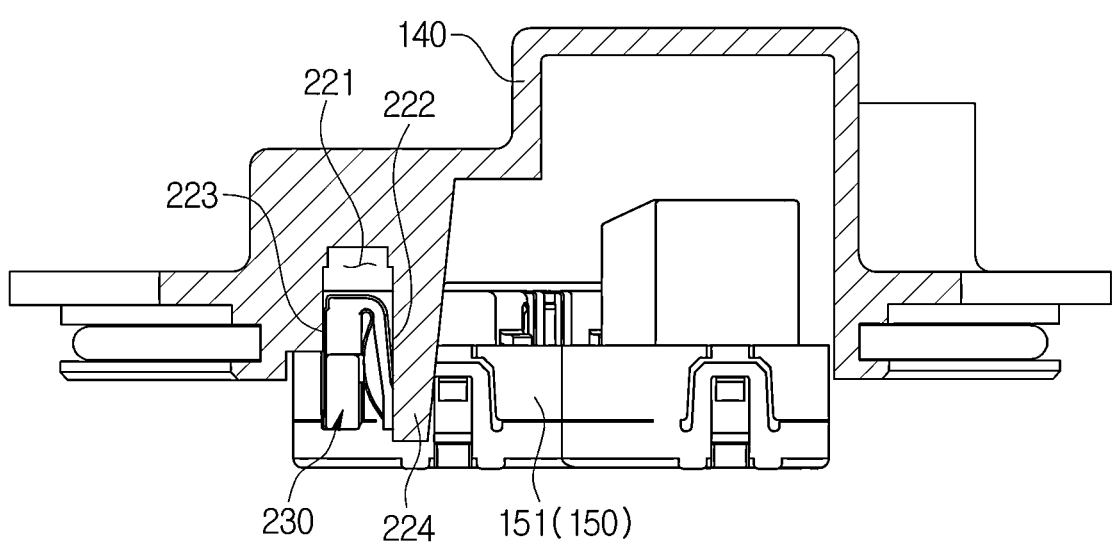
FIG. 5 is a cross-sectional view showing a coupling state of a fastening device according to one embodiment of the present disclosure.

As shown in FIGS. 4 and 5, the fixing slot 220 may be configured in the form of a slot groove 221 formed between a first slot surface 222 and a second slot surface 223 provided on the inner surface of the housing cover 140 in a direction toward the housing 110.

The first slot surface 222 formed at one side of the fixing slot 220 may extend in a slot direction to form a second boss part 224 capable of the other side surface, that is, a side surface opposite to the one side surface in contact with the first boss part 210, of the coupling part 230, and the second slot surface 223 formed at the other side thereof may extend shorter than the first slot surface 222. Accordingly, when the other side surface of the coupling part 230 is in contact with the second boss part 224, the second slot surface 223 is not in contact with the coupling part 230, and the coupling part 230 may not be inserted into the slot groove 221.

The first slot surface 222 and the second slot surface 223 may be provided on the inner surface of the housing cover 140 to support both side surfaces of the coupling part 230. Accordingly, the first slot surface 222 and the second slot surface 223 is formed to extend from the inner surface of the housing cover 140 in a direction in which the housing 110 is coupled to be spaced a predetermined distance from each other.

The first slot surface 222 and the second slot surface 223 may be formed to have a single body with the housing cover 140. Accordingly, when the coupling part 230 is inserted and coupled to the fixing slot 220, the sensing unit 150 is fixed to the housing cover 140 in a restricted movement state, and when the housing cover 140 is coupled to the housing 110, the sensing unit 150 is fixed to the housing 110.

The coupling part 230 may be formed to protrude from the frame 151 forming the exterior of the sensing unit 150. In this case, it is preferable that the coupling part 230 is formed on the frame 151 at a position close to the inner surface of the first accommodating part 111. More specifically, the coupling part 230 may include a coupling body 231 and an elastic member 233 formed on any one of both side surfaces of the coupling body 231.

The coupling body 231 is formed to protrude from the frame 151 toward the housing 110, that is, the inner surface of the first accommodating part 111. The coupling body 231 may be integrally formed with the frame 151.

The elastic member 233 may be provided to be elastically deformed when the coupling body 231 is coupled to the fixing slot 220. The elastic member 233 may include a first elastic part 234 formed to extend downward from an upper side of the coupling body 231 to have inclination and a second elastic part 235 provided between the first elastic part 234 and the coupling body 231 to elastically support the first elastic part 234.

The first elastic part 234 may include a bending portion 234a bent from the coupling body 231, an elastic arm 234b formed to extend from the bending portion 234a, and a round portion 234c having a larger thickness than the elastic arm 234b and formed at an end of the elastic arm 234b.

The second elastic part 235 may include a bending portion 235a formed to extend downward from the coupling body 231 and bent from the coupling body 231, a first elastic contact portion 235b extending to be curved from the bending portion 235a and provided to be in contact with the coupling body 231, and a second elastic contact portion 235c extending to be curved from the first elastic contact portion 235b and provided to be in contact with the first elastic part 234.

Accordingly, when the coupling part 230 is coupled to the fixing slot 220, the second slot surface 223 is coupled by being guided along one side surface of the coupling body 231 on which the elastic member 233 is not provided, and The first slot surface 222 forming the second boss part is coupled by pressing the elastic member 233. Accordingly, the elastic member 233 is pressed by the first slot surface 222 and elastically deformed toward the coupling body 231. As shown in FIG. 6, when the elastic member 233 is elastically deformed, the first elastic part 234 is elastically deformed toward the coupling body 231 with respect to the bending portion 234a according to the pressing of the first slot surface 222, and the first elastic contact portion 235b and the second elastic contact portion 235c of the second elastic part 235 are elastically deformed by the pressing according to the elastic deformation of the first elastic part 234 to provide an elastic restoring force to the first elastic part 234. Accordingly, a tight coupling state between the fixing slot 220 and the coupling part 230 can be maintained. The elastic member 233 may be integrally formed with the coupling body 231.

In one embodiment of the present disclosure, the elastic member 233 may include the first elastic part 234 formed to extend to have inclination downward from the upper side of the coupling body 231, and the second boss part 224 may be in contact with and may press the first elastic part 234 along the inclination of the first elastic part 234 when the housing cover 140 is coupled downward from the top. Accordingly, the coupling part 230 may be easily coupled to the fixing slot 220.

When the housing cover 140 is coupled to the housing 110, the coupling part 230 is in contact with the second boss part 224, coupled to the fixing slot 220, and spaced apart from the first boss part 210. That is, the coupling part 230 is in contact with the first boss part 210 to be coupled to the fixing slot 220, but when the housing cover 140 is coupled to the housing 110, the coupling part 230 is re-aligned to be spaced apart from the first boss part 210. This will be described again below through the method of assembling the pinion sensor structure.

Figure 8:
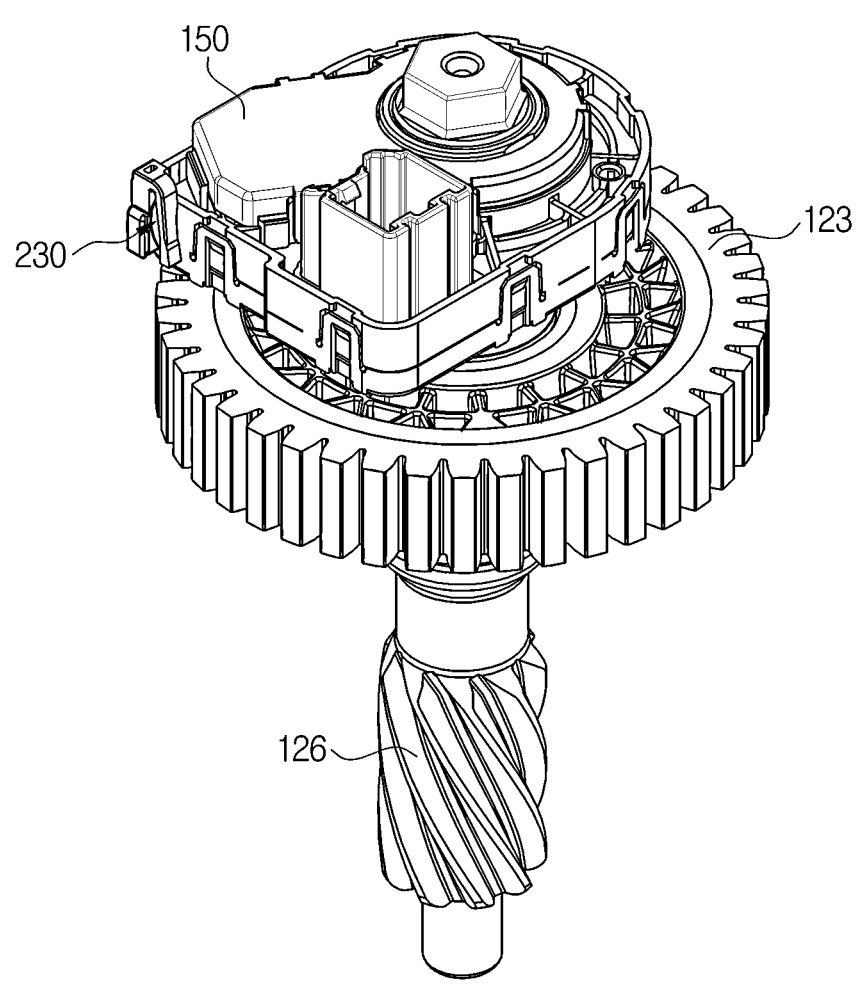
FIG. 8 is a view showing a state in which a sensing unit is disposed according to a method of assembling the pinion sensor structure according to one embodiment of the present disclosure.
Figure 9:
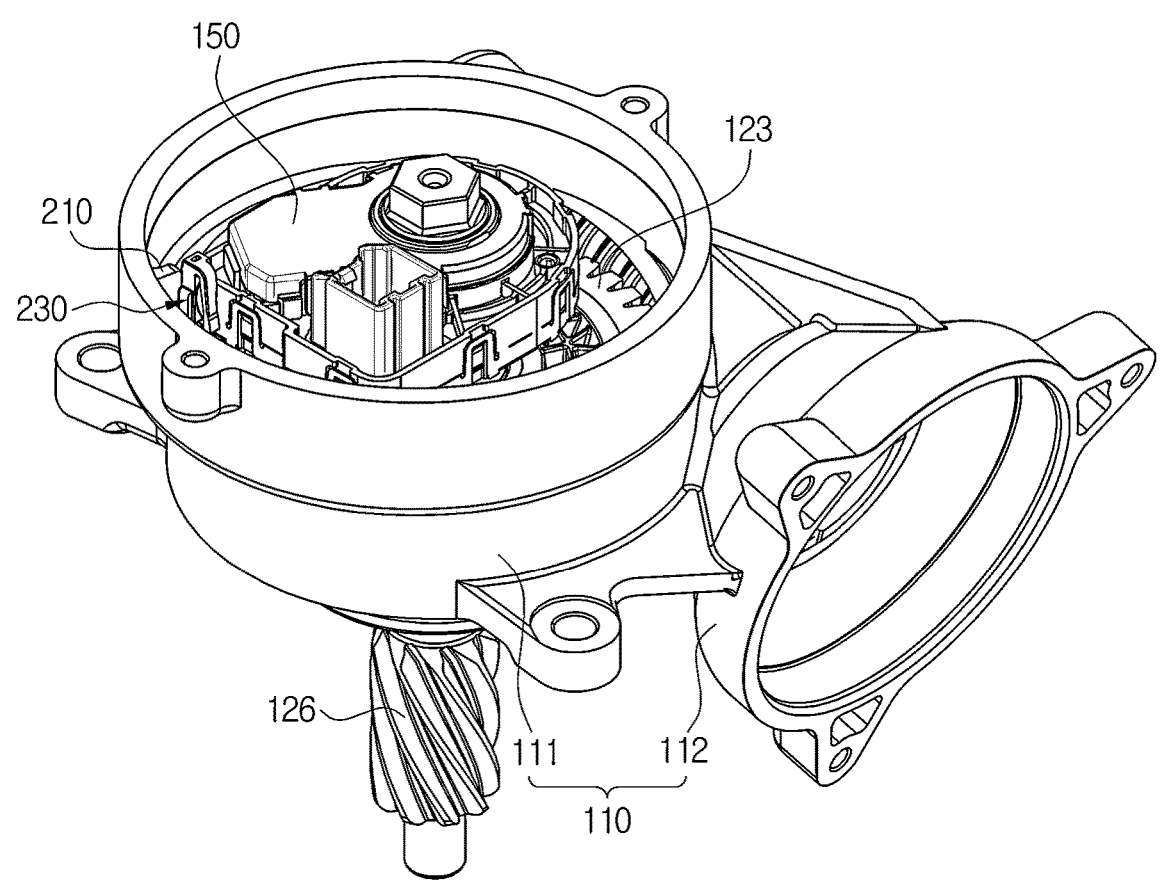

FIG. 8 is a view showing a state in which a sensing unit is disposed according to a method of assembling the pinion sensor structure according to one embodiment of the present disclosure, FIG. 9 is a view showing a state in which the sensing unit is accommodated in the housing according to the method of assembling the pinion sensor structure according to one embodiment of the present disclosure, FIGS. 10 and 11 are views showing a state in which one side surface of the coupling part is disposed to be in contact with the first boss part according to the method of assembling the pinion sensor structure according to one embodiment of the present disclosure, FIGS. 12 and 13 are views showing a state in which the housing cover is disposed according to the method of assembling the pinion sensor structure according to one embodiment of the present disclosure, FIG. 14 is a view showing a state in which the coupling part and the fixing slot are coupled according to the method of assembling the pinion sensor structure according to one embodiment of the present disclosure, and FIGS. and 16 are views showing a state in which the coupling part and the first boss part are separated according to the method of assembling the pinion sensor structure according to one embodiment of the present disclosure.

Referring to FIGS. 8 to 16, the method of assembling the pinion sensor structure of the steering apparatus according to one embodiment of the present disclosure may include arranging the sensing unit 150 spaced a predetermined distance from the worm wheel 123 to face the worm wheel 123, accommodating the worm wheel 123 and the sensing unit 150 in the first accommodating part 111 having an open one side surface and provided in the housing 110, arranging the one side surface of the coupling part 230 formed to protrude from the sensing unit 150 to be in contact with the first boss part 210 formed in the first accommodating part 111, arranging the housing cover 140 so that the second boss part 224 formed on the fixing slot 220 of the housing cover 140 is in contact with the other side surface of the coupling part 230, assembling the housing cover 140 to be in contact with the one side surface of the first accommodating part 111 in a state in which the coupling the part 230 and the second boss part 224 are in contact with each other and coupling the coupling part 230 and the fixing slot 220, aligning the housing cover 140 and the housing 110 and separating the coupling part 230 from the first boss part 210, and coupling the housing cover 140 and the housing 110.

FIG. 8 shows a state in which the arranging of the sensing unit 150 to be spaced the predetermined distance from the worm wheel 123 to face the worm wheel 123 has been performed. In the embodiment of the present disclosure, the worm wheel 123 is coupled to the output shaft 125 on which the pinion gear 126 is formed, and the sensing unit 15 is disposed to face the worm wheel 123 and coupled to the output shaft 125. The sensing unit 150 may detect the rotation of the coupled output shaft 125 or detect the rotation of the facing worm wheel 123.

FIG. 9 shows a state in which the accommodating of the worm wheel 123 and the sensing unit 150 in the first accommodating part 111 provided in the housing 110 and having the open one side surface has been performed. In one embodiment of the present disclosure, a structure in which the worm wheel 123, the output shaft 125, the pinion gear 126, and the sensing unit 150 are coupled is accommodated in the first accommodating part 111 of the housing 110. The first accommodating part 111 has the open one side surface so that the worm wheel 123 and the sensing unit 150 may be inserted and accommodated therein.

FIGS. 10 and 11 show a state in which the arranging of the one side surface of the coupling part 230 formed to protrude from the sensing unit 150 to be in contact with the first boss part 210 formed on the first accommodating part 111 has been performed.

When the sensing unit 150 is accommodated in the first accommodating part 111, the one side surface of the coupling part 230 may be disposed to be in contact with the first boss part 210 as shown in FIGS. 10 and 11. By arranging the one side surface of the coupling part 230 to be in contact with the first boss part 210, an assembly operator may easily identify a position of the coupling part 230 when the housing cover 140 is coupled and easily insert and couple the coupling part 230 into and to the fixing slot 220.

FIGS. 12 and 13 show a state in which the arranging of the housing cover 140 so that the second boss part 224 formed on the fixing slot 220 of the housing cover 140 is in contact with the other side surface of the coupling part 230 has been performed.

When assembling, the operator needs to couple the housing cover 140 to the open one side surface of the first accommodating part 111 of the housing 110. In this case, it is necessary to insert and couple the coupling part 230 of the sensing unit 150 into and to the fixing slot 220 provided on the housing cover 140. To this end, the positions of the fixing slot 220 and the coupling part 230 need to be aligned. In the present disclosure, the operator may arrange the second boss part 224 formed on the fixing slot 220 to be in contact with the other side surface of the coupling part 230 and align the fixing slot 220 and the coupling part 230.

In this case, since the first slot surface 222 on which the second boss part 224 is formed protrudes to extend longer than the second slot surface 223 at the opposite side of the fixing slot 220, the second boss part 224 and the coupling part 230 may not be in contact with each other even when the second boss part 224 is in contact with the coupling part 230. Accordingly, the coupling part 230 is in a state of being not inserted into the slot groove 221 of the fixing slot 220. In this case, the housing cover 140 may be spaced a predetermined distance $d_1$ from the first accommodating part 111 of the housing 110.

Meanwhile, when the one side surface of the coupling part 230 is in contact with the first boss part 210 and the other side surface thereof is in contact with the second boss part 224 as described above, the housing cover 140 may be rotated at a predetermined angle at a final coupling position with the first accommodating part 111 of the housing 110. FIG. 12 shows the state of the housing cover 140 rotated as described above. In the disclosed embodiment, a cover coupling portion 145 provided on the housing cover 140 may be aligned with and coupled to a housing coupling portion 115 provided on the housing 110. In this case, since the housing cover 140 is rotated at the predetermined angle at the final coupling position with the first accommodating part 111 of the housing 110, the cover coupling portion 145 and the housing coupling portion 115 are disposed in a state of being not aligned.

FIG. 14 shows a state in which the assembling of the housing cover 140 to be in contact with the one side surface of the first accommodating part 111 in the state in which the coupling part 230 and the second boss part 224 are in contact with each other has been performed.

As shown in FIGS. 12 and 13, after arranging the second boss part 224 to be in contact with the other side surface of the coupling part 230 and aligning the fixing slot 220 and the coupling part 230, the operator assembles the housing cover 140 to be in contact with the one side surface of the first accommodating part 111 in the state in which the second boss part 224 is in contact with the coupling part 230. As the housing cover 140 is assembled to be in contact with the one side surface of the first accommodating part 111, the coupling part 230 is inserted into and coupled to the fixing slot 220 using the second boss part 224 as a guide. That is, the coupling part 230 is fixed in the state in which the one side surface is in contact with the first boss part 210 and the other side surface is in contact with the second boss part 224 and inserted into and coupled to the fixing slot 220. Since the operator may not visually check the positions of the fixing slot 220 and the coupling part 230 due to the housing cover 140, the operator may maintain the contact between the second boss part 224 and the coupling part 230 and assemble the housing cover 140 so that the coupling part 230 may be easily inserted into and coupled to the fixing slot 220 without being damaged by unreasonable assembly.

FIGS. 15 and 16 show a state in which the aligning of the housing cover 140 and the housing 110 and separating of the coupling part 230 from the first boss part 210 has been performed.

As described above, when the first boss part 210 is in contact with the one side surface of the coupling part 230 and the second boss part 224 is in contact with the other side surface thereof, the housing cover 140 is rotated at a predetermined angle at a final coupling position with the housing 110. The operator may insert and couple the coupling part 230 into and to the fixing slot 220 and then rotate the housing cover 140 as indicated by an arrow in FIG. 15 to align the housing cover 140 and the housing 110.

When the housing cover 140 is rotated and aligned as described above, as shown in FIG. 16, the coupling part 230 coupled to the fixing slot 220 rotates together with the housing cover 140 to be spaced by a predetermined distance $d_2$ from the first boss part 210.

Thereafter, in the coupling of the housing cover 140 and the housing 110, the housing cover 140 and the housing 110 may be coupled using a fastening member, such as a screw, between the cover coupling portion 145 of the housing cover 140 and the housing coupling portion of the housing 110.

As described above, in one embodiment of the present disclosure, the assembling is performed by coming the one side surface of the coupling part 230 into contact with the first boss part 210, coming the second boss part 224 of the housing cover 140 into contact with the other side surface of the coupling part 230, and coupling the housing cover 140 to be in contact with the housing 110 so that the coupling part 230 is fixedly inserted into the fixing slot 220 in order to couple the coupling part 230 to the fixing slot 220 provided on the housing cover 140, and rotating and aligning the housing cover 140 with the housing 110 so that the coupling part 230 is spaced apart from the first boss part 210.

The first boss part 210 serves as a guide for inserting and coupling the coupling part 230 into and to the fixing slot 220 provided on the housing cover 140 so that the assembling is easily performed, and when the housing cover 140 is assembled, the coupling part 230 is spaced apart from the first boss part 210 so that whether the sensor unit 150 is fixed to the housing cover 140 may be easily checked.

As is apparent from the above description, a pinion sensor structure of a steering apparatus and a steering apparatus having the same according to the present disclosure can prevent a sensor damage or sensor non-fixing situation that may occur when a sensing unit is fixed to a housing cover.

As described above, the disclosed embodiments have been described with reference to the accompanying drawings. Those skilled in the art to which the present disclosure pertains will understand that the present disclosure can be carried out in the form different from the disclosed embodiments without changing the technical spirit or essential features of the present disclosure. The disclosed embodiments are illustrative and should not be construed as being limited.

What is claimed is:

1. A pinion sensor structure of a steering apparatus, comprising:

a housing including a first accommodating part having an open one side surface and configured to accommodate a worm wheel and a second accommodating part configured to communicate with the first accommodating part and accommodate a worm shaft engaged with the worm wheel;

a sensing unit disposed to be spaced a predetermined distance from the worm wheel to face the worm wheel; and a housing cover coupled to the one side surface of the first accommodating part, wherein the sensing unit is fixed to the housing cover, the sensing unit includes a coupling part formed to protrude from a frame forming an exterior of the sensing unit, the housing cover includes a fixing slot formed on an inner surface of the housing cover so that the coupling part is inserted and coupled thereto, the first accommodating part is formed with a first boss part with which one side surface of the coupling part is in contact, and the fixing slot is formed with a second boss part with which the other side surface of the coupling part is in contact.

2. The pinion sensor structure of claim 1, wherein the fixing slot has a first slot surface formed at one side thereof and extending in a slot direction to form the second boss part, and a second slot surface formed at the other side thereof and extending shorter than the first slot surface in the slot direction.

3. The pinion sensor structure of claim 1, wherein when the housing cover is coupled to the housing, the coupling part is in contact with the second boss part, coupled to the fixing slot, and spaced apart from the first boss part.

4. A steering apparatus comprising:

a housing including a first accommodating part having an open one side surface and configured to accommodate a worm wheel coupled to an output shaft and a second accommodating part configured to communicate with the first accommodating part and accommodate a worm shaft engaged with the worm wheel;

a motor coupled to the worm shaft to provide a rotating force to the worm wheel through the worm shaft;

a sensing unit disposed to be spaced a predetermined distance from the worm wheel to face the worm wheel; and a housing cover coupled to the one side surface of the first accommodating part, wherein the sensing unit is fixed to the housing cover, the sensing unit includes a coupling part formed to protrude from a frame forming an exterior of the sensing unit, the housing cover includes a fixing slot formed on an inner surface of the housing cover so that the coupling part is inserted and coupled thereto, the first accommodating part is formed with a first boss part with which one side surface of the coupling part is in contact, and the fixing slot is formed with a second boss part with which the other side surface of the coupling part is in contact.

5. The steering apparatus of claim 4, wherein the fixing slot has a first slot surface formed at one side thereof and extending in a slot direction to form the second boss part, and a second slot surface formed at the other side thereof and extending shorter than the first slot surface in the slot direction.

6. The steering apparatus of claim 4, wherein when the housing cover is coupled to the housing, the coupling part is in contact with the second boss part, coupled to the fixing slot, and spaced apart from the first boss part.

7. A method of assembling a pinion sensor structure of a steering apparatus, comprising:

arranging a sensing unit to be spaced a predetermined distance from a worm wheel to face the worm wheel;

accommodating the worm wheel and the sensing unit in a first accommodating part having an open one side surface and provided in a housing;

arranging one side surface of a coupling part formed to protrude from the sensing unit to be in contact with a first boss part formed in the first accommodating part;

arranging a housing cover so that a second boss part formed on a fixing slot of the housing cover is in contact with the other side surface of the coupling part;

assembling the housing cover to be in contact with one side surface of the first accommodating part in a state in which the coupling part and the second boss part are in contact with each other, and coupling the coupling part and the fixing slot;

aligning the housing cover and the housing and separating the coupling part from the first boss part; and coupling the housing cover and the housing.

* * * * *